United States Patent
El Defrawy et al.

(10) Patent No.: US 9,558,359 B1
(45) Date of Patent: Jan. 31, 2017

(54) INFORMATION THEORETICALLY SECURE PROTOCOL FOR MOBILE PROACTIVE SECRET SHARING WITH NEAR-OPTIMAL RESILIENCE

(71) Applicant: HRL Laboratories, LLC, Malibu, CA (US)

(72) Inventors: Karim El Defrawy, Santa Monica, CA (US); Joshua W. Baron, Los Angeles, CA (US); Joshua D. Lampkins, Gardena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/449,115

(22) Filed: Jul. 31, 2014

Related U.S. Application Data

(63) Continuation-in-part of application No. 14/207,321, filed on Mar. 12, 2014.

(60) Provisional application No. 61/780,638, filed on Mar. 13, 2013, provisional application No. 61/861,325, filed on Aug. 1, 2013.

(51) Int. Cl.
*H04L 29/06* (2006.01)
*G06F 21/60* (2013.01)

(52) U.S. Cl.
CPC ............. *G06F 21/60* (2013.01); *H04L 63/04* (2013.01)

(58) Field of Classification Search
CPC .... H04L 9/3218; H04L 9/3013; H04L 9/3255; H04L 63/065
USPC ........................................................ 726/26
See application file for complete search history.

(56) References Cited

U.S. PATENT DOCUMENTS

| | | | |
|---|---|---|---|
| 4,633,470 A | 12/1986 | Welch et al. | |
| 5,625,692 A | 4/1997 | Herzberg et al. | |
| 6,035,041 A | 3/2000 | Frankel et al. | |
| 7,003,677 B1* | 2/2006 | Herzberg | H04L 9/0833 380/286 |
| 7,313,701 B2* | 12/2007 | Frankel et al. | 713/180 |
| 2001/0038696 A1* | 11/2001 | Frankel | G06Q 20/382 380/286 |
| 2004/0139146 A1* | 7/2004 | Cachin | H04L 9/085 709/200 |
| 2010/0037055 A1* | 2/2010 | Fazio et al. | 713/171 |

OTHER PUBLICATIONS

Harn, Lein, and Changlu Lin. "Strong (n, t, n) verifiable secret sharing scheme." Information Sciences 180.16 (2010): 3059-3064.*

(Continued)

*Primary Examiner* — Syed Zaidi
(74) *Attorney, Agent, or Firm* — Tope-McKay & Associates

(57) ABSTRACT

Described, is system for mobile proactive secret sharing. The system initializes a RobustShare protocol to distribute a block of secret data among a set of servers comprising n servers. The block of secret data comprises a plurality of shares of data, wherein each server in the set of servers holds one share of data encoding the block of secret data. At least one Block-Redistribute protocol is initialized to protect against at least one adversary that attempts to corrupt the set of servers. During a Block-Redistribute protocol, the set of servers periodically refreshes its plurality of shares of data such that each server holds a new share of data that is independent of the previous share of data. Finally, a Reco protocol is initialized to reveal the block of secret data.

20 Claims, 3 Drawing Sheets

(56) References Cited

OTHER PUBLICATIONS

Zuzana Beerliova-Trubniova and Martin Hirt. Ecient multi-party computation with dispute control. In TCC, pp. 305-328, 2006.
Adi Shamir How to share a secret. Commun. ACM, 22(11),612-613, 1979.
Elwyn R. Berlekamp, Algebraic Coding Theory. Aegean Park Press, Chapter 7, 1984.
Gabriel Bracha. An O(log n) expected rounds randomized byzantine generals protocol. J. ACM, 34(4):910-920, 1987.
Zuzana Beerliova-Trubiniova and Martin Hirt. Perfectly-secure mpc with linear communication compiexity InTCC, pp. 213-230, 2008.
Christian Cachin, Klaus Kursawe, Anna Lysyanskaya, and Reto Strobl. Asynchronous verifiable secret sharing and proactive cryptosystems. In ACM Conference on Computer and Communications Security, pp. 88-97, 2002.
Ivan Damgard, Yuval Ishai, Mikkel Kroigaard, Jesper Buus Nielsen, and Adam Smith. Scalable multiparty computation with nearly optimal work and resilience. In CRYPTO, pp. 241-261, 2008.
Ivan Damgard, Yuval Ishai, and Mikkel Kroigaard, Perfectly secure multiparty computation and the computational overhead of cryptography, In EUROCRYPT, pp. 445-465, 2010.
Yvo Desmedt and Sushil Jajodia. Redistributing secret shares to new access structures and its applications. Jul. 1997. Technical Report ISSE TR-97-01, George Mason University.
Ivan Damgard and Jesper Buus Nielsen. Scalable and unconditionally secure multiparty computation, In CRYPTO, pp. 572-590, 2007.
Michael J. Fischer and Nancy A. Lynch. A lower bound for the time to assure interactive consistency. Inf. Process. Lett., 14(4);183-188, 1982.
Shuhong Gao. A new algorithm for decoding reed-solomon codes. In Communications, Information and Network Security, Editors V.Bhargava, H.V.Poor, V.Tarokh, and S.Yoon, pp. 58-88. Kluwer, 2002.
Juan A. Garay and Yoram Moses. Fully polynomial byzantine agreement in t+1 rounds. In STOC, pp. 31-41, 1993.
Oded Goldreich. Foundations of Cryptography: vol. 2, Basic Applications. Cambridge University Press, Chapter 7, 2009.
Amir Herzberg, Stanislaw Jarecki, Hugo Krawczyk, and Moti Yung. Proactive secret sharing or: How to cope with perpetual leakage. In CRYPTO, pp. 339-353, 1995.
David Schultz. Mobile Proactive Secret Sharing. PhD thesis, Massachusetts Institute of Technology, 2007.
Theodore M. Wong, Chenxi Wang, and Jeannette M. Wing, Verifiable secret redistribution for archive system. In IEEE Security in Storage Workshop, pp. 94-106, 2002.
Lidong Zhou, Fred B. Schneider, and Robbert van Renesse. Apss: proactive secret sharing in asynchronous systems. ACM Trans. Inf. Syst. Secur., 8(3):259-286, 2005.
Alfred V. Aho, John E. Hopcroft, and J. D. Ullman, The Design and Analysis of Computer Atgorithms. Addison-Wesley, 1974, pp. 299-300.
Christian Cachin, Klaus Kursawe, Anna Lysyanskaya, and Reto Strobl. Asynchronous verifiable secret sharing and proactive cryptosystems, In ACM Conference on Computer and Communications Security, pp. 88-97, 2002.
Yvo Desmedt and Sushil Jajodia, Redistributing secret shares to new access structures and its applications. Jul. 1997, Technical Report ISSE TR-97-01, George Mason University.
Amir Herzberg, Stanislaw Jarecki, Hugo Krawczyk and Moti Yung. Proactive secret sharing or: How to cope with perpetual leakage. In CRYPTO, pp. 339-352, 1995.
Torben P. Pedersen. Non-interactive and information-theoretic secure verifiable secret sharing. In Joan Feigenbaum, editor, CRYPTO, vol. 576 of Lecture Notes in Computer Science, pp. 129-140, Springer, 1991.
David Schultz. Mobile Proactive Secret Sharing PhD thesis, Massachusetts Institute of Technology, 2007.

Adi Shamir. How to share a secret. Commun. ACM, 22(11):612-613, 1979.
Lidong Zhou, Fred B. Schneider, and Robbert van Renesse. Apss: proactive secret sharing in asynchronous systems. ACM Trans. Inf. Syst. Secur., 8(3)259-286, 2005.
Office Action 1 for U.S. Appl. No. 14/449,868, Date mailed: Aug. 13, 2015.
Bai, Li, and XuKai Zou, "A proactive secret sharing scheme in matrix projection method," International Journal of Security and Networks 4.4 (2009), pp. 201-209.
Harn, Lein, and Changlu Lin, "Strong (n, t, n) verifiable secret sharing scheme," Information Sciences 180.16 (2010), pp. 3059-3064.
Office Action 1 Response for U.S. Appl. No. 14/449,868, Date mailed: Dec. 10, 2015.
Office Action 2 for U.S. Appl. No. 14/449,868, Date mailed: Jan. 29, 2016.
Office Action 1 for U.S. Appl. No. 14/207,321, Date mailed: May 18, 2015.
Office Action 1 Response for U.S. Appl. No. 14/207,321, Date mailed: Aug. 18, 2015.
Office Action 2 for U.S. Appl. No. 14/207,321, Date mailed: Dec. 14, 2015.
Office Action 2 Response for U.S. Appl. No. 14/207,321, Date mailed: Apr. 14, 2016.
Joshua Baron and Karim El Defrawy and Joshua Lampkins and Rafail Ostrovsky, "How to Withstand Mobile Virus Attacks, Revisited," PODC '14, Proceedings of the 2014 ACM symposium on Principles of distributed computing, pp. 293-302.
Office Action 1 for U.S. Appl. No. 14/477,613, Date mailed: Oct. 8, 2015.
Office Action 1 Response for U.S. Appl. No. 14/207,321, Date mailed: Jan. 7, 2016
Office Action 2 for U.S. Appl. No. 14/477,613, Date mailed: Feb. 26, 2016.
Alfred V. Aho, John E. Hopcroft, and J. D. Ullman. The Design and Analysis of Computer Algorithms. Addison-Wesley, pp. 299-300, 1974.
Vaclav E. Benes. Optimal rearrangeable multistage connecting networks. The Bell System Technical Journal, 43(4):1641-1656, Jul. 1964.
Elwyn R. Berlekamp. Algebraic Coding Theory. Aegean Park Press, 1984, Chapter 7.
Michael Ben-Or, Shafi Goldwasser, and Avi Wigderson. Completeness theorems for non-cryptographic fault-tolerant distributed computation (extended abstract). In STOC, pp. 1-10, 1988.
Gabriel Bracha. An O(log n) expected rounds randomized byzantine generals protocol. J. ACM, 34(4)910-920, 1987.
Eli Ben-Sasson, Serge Fehr, and Rafail Ostrovsky. Near-linear unconditionally-secure multiparty computation with a dishonest minority. Cryptology ePrint Archive, Report 2011/629, 2011.
Zuzana Beerliova-Trubiniova and Martin Hirt. Efficient multi-party computation with dispute control. In TCC, pp. 305-328, 2006.
Zuzana Beerliova-Trubiniova and Martin Hirt. Perfectly-secure mpc with linear communication complexity. In TCC, pp. 213-230, 2008.
Ivan Damdard, Yuval Ishai, Mikkel Kroigaard, Jesper Buus Nielsen, and Adam Smith. Scalable multiparty computation with nearly optimal work and resilience. In CRYPTO, pp. 241-261, 2008.
Ivan Damgard, Yuval Ishai, and Mikkel Kroigaard. Perfectly secure multiparty computation and the computation and the computational overhead of cryptography. In EUROCRYPT, pp. 445-465, 2010.
Ivan Damgard and Jesper Buus Nielsen. Scalable and unconditionally secure multiparty computation. In CRYPTO, pp. 572-590, 2007.
Michael J. Fischer and Nancy A. Lynch. A lower bound for the time to assure interactive consistency. Inf. Process. Lett., 14(4)183-186, 1982.
Matthew K. Franklin and Moti Yung. Communication complexity of secure computation (extended abstract). In STOC, pp. 699-710, 1992.

(56) References Cited

OTHER PUBLICATIONS

Shuhong Gao. A new algorithm for decoding reed-solomon codes. In Communications, Information and Network Security, Editors V.Bhargava, H.V.Poor, V.Tarokh, and S.Yoon, pp. 55-68. Kluwer, 2002.

Craig Gentry, Shai Halevi, and Nigel P. Smart, Fully homomorphic encryption with polylog overhead. In EURO-CRYPT, pp. 465-482, 2012.

Juan A. Garay and Yoram Moses. Fully polynomial byzantine agreement in t+1 rounds. In STOC. pp. 31-41, 1993.

Frank Thomson Leighton. Introduction to parallel algorithms and architectures: arrays, trees, hypercubes. Morgan Kaufmann, 1992, section 3.2.

Rafail Ostrovsky and Moti Yung. How to withstand mobile virus attacks (extended abstract). In PODC, pp. 51-59, 1991.

Abraham Waksman. A permutation network. J. ACM, 15(1):159-163, 1968.

Office Action 2 Response for U.S. Appl. No. 14/449,868 Date mailed: Apr. 29, 2016.
Notice of Allowance for U.S. Appl. No. 14/449,868 Date mailed: May 25, 2016.
Notice of Allowance for U.S. Appl. No. 14/207,321 Date mailed: May 4, 2016.
Office Action 1 for U.S. Appl. No. 14/447,613 Date mailed: Oct. 8, 2015.
Office Action 1 Response for U.S. Appl. No. 14/447,613 Date mailed: Jan. 7, 2016.
Office Action 2 for U.S. Appl. No. 14/447,613 Date mailed: Feb. 26, 2016.
Office Action 2 Response for U.S. Appl. No. 14/447,613 Date mailed: Jan. 7, 2016.
Office Action 3 for U.S. Appl. No. 14/447,613 Date mailed: May 26, 2016.
Damgard, Ivan, and Jesper Buus Nielsen. "Scalable and unconditionally secure multiparty computation." Advances in Cryptology-CRYPTO 2007. Springer Berlin Heidelberg, 2007, pp. 572-590.

* cited by examiner

INFORMATION THEORETICALLY SECURE PROTOCOL FOR MOBILE PROACTIVE SECRET SHARING WITH NEAR-OPTIMAL RESILIENCE

CROSS-REFERENCE TO RELATED APPLICATIONS

This is a Continuation-in-Part application of U.S. Non-Provisional Application No. 14/207,321, filed in the United States on Mar. 12, 2014, entitled, "System and Method for Mobile Proactive Secret Sharing," which is a Non-Provisional patent application of U.S. Provisional Application No. 61/780,638, filed in the United States on Mar. 13, 2013, entitled, "An Efficient Protocol for Mobile Proactive Secret Sharing."

This is ALSO a Non-Provisional patent application of U.S. Provisional Application No. 61/861,325, filed in the United States on Aug. 1, 2013, entitled, "An Information Theoretically Secure Protocol for Mobile Proactive Secret Sharing with Near-Optimal Resilience."

FIELD OF INVENTION

The present invention relates to a secret sharing system and, more particularly, to a secret sharing system that provides perfect security.

BACKGROUND OF THE INVENTION

Secret sharing is a process by which secrets are distributed among an arbitrary number of servers. A concern in secret sharing is the possibility of an adversary who may corrupt a fixed portion of the servers. When the adversary corrupts a server, it learns all information stored on that server. The adversary can force corrupt servers to behave arbitrarily, irrespective of the protocol. Thus, it is imperative to implement a secure secret sharing protocol.

The secret sharing schemes of Herzberg et al. (see the List of Incorporated Cited Literature References, Literature Reference No. 16) and of Cachin et al. (see Literature Reference No. 6) are non-mobile (i.e., they do not allow the set of servers holding the secret to change). Desmedt and Jajodia's scheme (see Literature Reference No. 9) only works for passive adversaries (i.e., it only works if corrupted servers follow the protocol).

The schemes of Wong, Wang, and Wing (see Literature Reference No. 18), of Zhou et al. (see Literature Reference No. 19), and of Schultz (see Literature Reference No. 17) do not have optimal efficiency. The protocols described in Literature Reference Nos. 18 and 19 have communication complexity $O(\exp(n))$, and Literature Reference No. 17 has communication complexity $O(n^3)$.

Thus, a continuing need exists for a system having mobile proactive secret sharing (MPSS) functionality that provides perfect security.

SUMMARY OF THE INVENTION

The present invention relates to a secret sharing system and, more particularly, to a secret sharing system that provides perfect security. The system comprises one or more processors and a memory having instructions such that when the instructions are executed, the one or more processors perform multiple operations. The system initializes a RobustShare protocol to distribute a block of secret data among a set of servers comprising n servers, wherein the block of secret data comprises a plurality of shares of data, and wherein each server in the set of servers holds one share of data encoding the block of secret data. The system then initializes at least one Block-Redistribute protocol to protect against at least one adversary that attempts to corrupt the set of servers, wherein during a Block-Redistribute protocol the set of servers periodically refreshes its plurality of shares of data such that each server holds a new share of data that is independent of the previous share of data. Finally, the system initializes a Reco protocol to reveal the block of secret data.

In another aspect, the block of secret data is of size l, wherein l is the highest power of 2 not greater than n/4, and wherein each block of secret data is stored in a polynomial H of degree$\leq d=l+2t-1$, where t denotes a threshold of corruption defines a maximum number of servers the at least one adversary may corrupt.

In another aspect, n can increase or decrease by a factor of two at each Block-Redistribute protocol regardless of t.

In another aspect, the system provides perfect security, such that provided that the at least one adversary does not corrupt more than t servers, the probability of the at least one adversary compromising the privacy or correctness of the block of secret data is zero.

In another aspect, the threshold of corruption t is $\frac{1}{3}-\epsilon$, where $\epsilon$ is an arbitrary positive constant, wherein provided that the at least one adversary corrupts no more than a $\frac{1}{3}-\epsilon$ fraction of the set of servers, then the system maintains its security.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
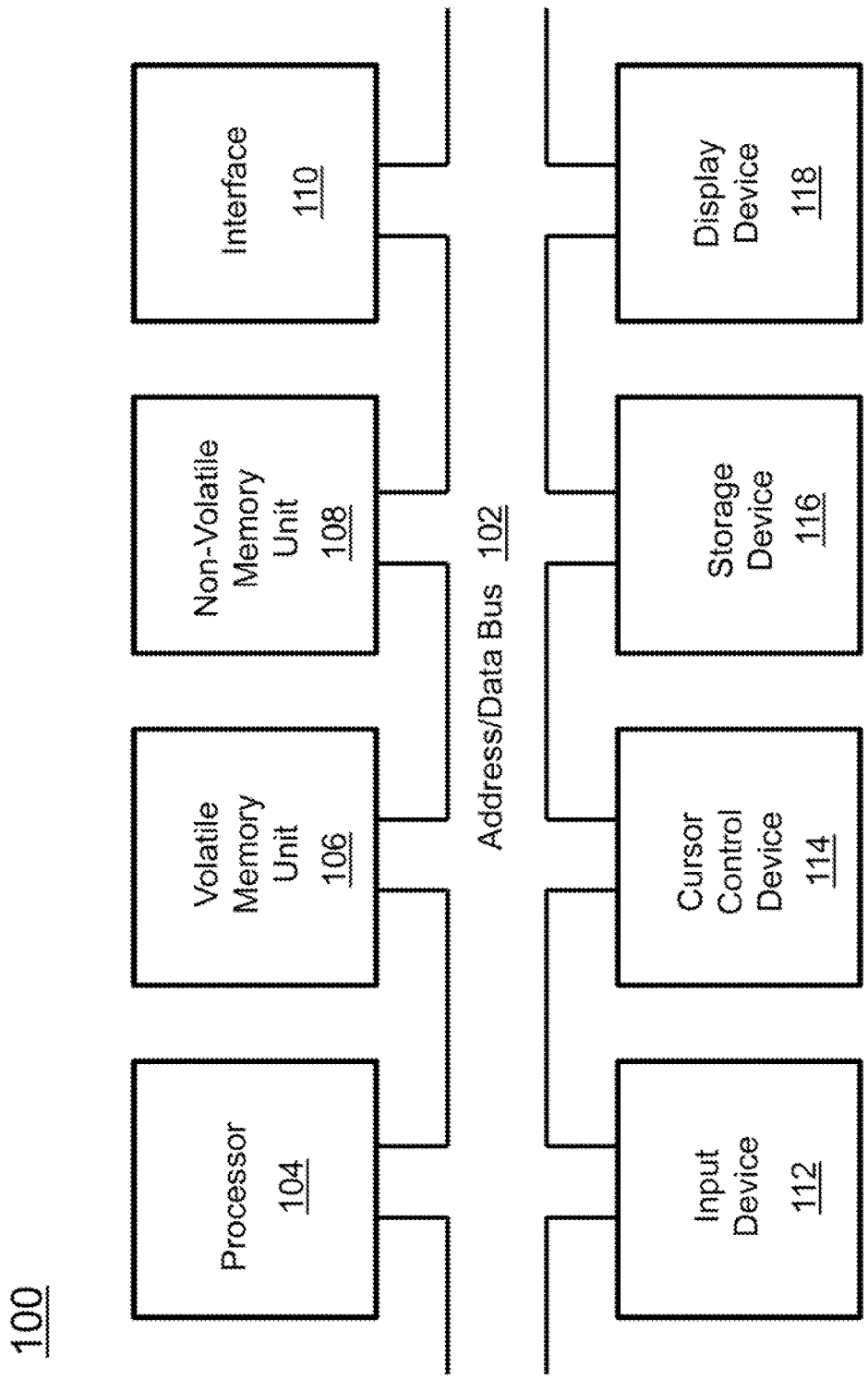
FIG. 1 is a block diagram depicting the components of a system for proactive secret sharing according to the principles of the present invention.

The present invention relates to a secret sharing system and, more particularly, to a secret sharing system that provides perfect security. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects.

Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Alfred V. Aho, John E. Hoperoft, and J. D. Ullman. The Design and Analysis of Computer Algorithms. Addison-Wesley, pages 299-300, 1974.
2. Elwyn R. Berlekamp. Algebraic Coding Theory. Aegean Park Press, Chapter 7, 1984.
3. Michael Ben-Or, ShafiGoldwasser, and Avi Wigderson. Completeness theorems for non-cryptographic fault-tolerant distributed computation (extended abstract). In STOC, pages 1-10, 1988.
4. Gabriel Bracha. An O(log n) expected rounds randomized byzantine generals protocol. J. ACM, 34(4):910-920, 1987.
5. Zuzana Beerliova-Trubiniova and Martin Hirt. Perfectly-secure mpc with linear communication complexity. In *TCC*, pages 213-230, 2008.
6. Christian Cachin, Klaus Kursawe, Anna Lysyanskaya, and Reto Strobl. Asynchronous verifiable secret sharing and proactive cryptosystems. In ACM Conference on Computer and Communications Security, pages 88-97, 2002.
7. Ivan Damgard, Yuval Ishai, Mikkel Kroigaard, Jesper Buus Nielsen, and Adam Smith. Scalable multiparty computation with nearly optimal work and resilience. In CRYPTO, pages 241-261, 2008.
8. Ivan Damgard, Yuval Ishai, and Mikkel Kroigaard. Perfectly secure multiparty computation and the computational overhead of cryptography. In EUROCRYPT, pages 445-465, 2010.
9. Yvo Desmedt and Sushil Jajodia. Redistributing secret shares to new access structures and its applications. July 1997. Technical Report ISSE TR-97-01, George Mason University.
10. Ivan Damgard and Jesper Buus Nielsen. Scalable and unconditionally secure multiparty computation. In CRYPTO, pages 572-590, 2007.
11. Michael J. Fischer and Nancy A. Lynch. A lower bound for the time to assure interactive consistency. Inf. Process. Lett., 14(4):183-186, 1982.
12. Matthew K. Franklin and Moti Yung. Communication complexity of secure computation (extended abstract). In STOC, pages 699-710, 1992.
13. Shuhong Gao. A new algorithm for decoding reed-solomon codes. In Communications, Information and Network Security, Editors V. Bhargava, H. V. Poor, V. Tarokh, and S. Yoon, pages 55-68. Kluwer, 2002.
14. Juan A. Garay and Yoram Moses. Fully polynomial byzantine agreement in t+1 rounds. In STOC, pages 31-41, 1993.
15. Oded Goldreich. Foundations of Cryptography: Volume 2, Basic Applications. Cambridge University Press, Chapter 7, 2009.
16. Amir Herzberg, Stanislaw Jarecki, Hugo Krawczyk, and Moti Yung. Proactive secret sharing or: How to cope with perpetual leakage. In CRYPTO, pages 339-352, 1995.
17. David Schultz. Mobile Proactive Secret Sharing. PhD thesis, Massachusetts Institute of Technology, 2007.
18. Theodore M. Wong, Chenxi Wang, and Jeannette M. Wing. Verifiable secret redistribution for archive system. In IEEE Security in Storage Workshop, pages 94-106, 2002.
19. Lidong Zhou, Fred B. Schneider, and Robbert van Renesse. Apss: proactive secret sharing in asynchronous systems. ACM Trans. Inf. Syst. Secur., 8(3):259-286, 2005.

(2) Principal Aspects

The present invention has three "principal" aspects. The first is a system for secret sharing. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
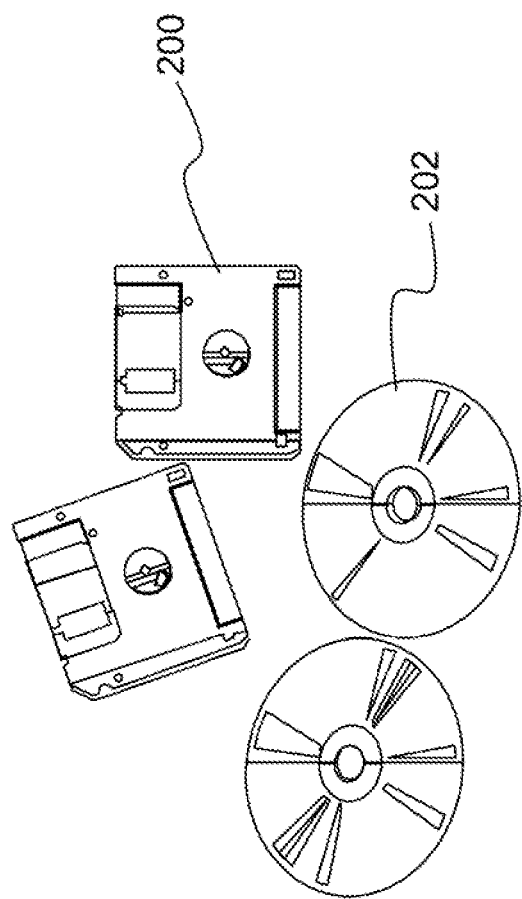
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The system according to the principles of the present invention incorporates a collection of protocols implementing mobile proactive secret sharing (MPSS) functionality. The system allows a secret to be securely distributed among an arbitrary number of servers (also referred to as players or parties in multi-party computation) and dynamically transferred to a new set of servers. Furthermore, the secrets may be redistributed among the same set of servers in such a way that if an adversary compromises no more than a fixed fraction of the servers, the adversary will not gain any information about the data and cannot cause data corruption. This remains true even if the adversary is allowed to eventually compromise all the servers, so long as no more than a fixed fraction is compromised during any given stage of the operation of the MPSS protocol.

The protocol improves upon previously known mobile proactive secret sharing protocols in that it allows for the number of servers used in the computation to decrease without relying on virtual servers to engage in the protocol. Further, among those protocols secure against active adversaries, the protocol according to the principles of the present invention has the lowest communication complexity. This protocol can be used to securely store data distributed among a group of servers in such a way that if a malicious party captures a (limited) fraction of the data, then this data will "expire" after a given time. Any "expired" data gives the malicious party no information about the secret stored data.

Additionally, the system according to the principles of the present invention provides perfect security. Perfect security means the probability of an adversary being able to compromise the security of the computation is zero, and this security does not rely on any mathematical infeasibility assumption. Thus, as can be appreciated by those skilled in the art, the present invention provides for a secure, mobile proactive secret sharing system.

(4) Specific Details of the Invention

Figure 3:
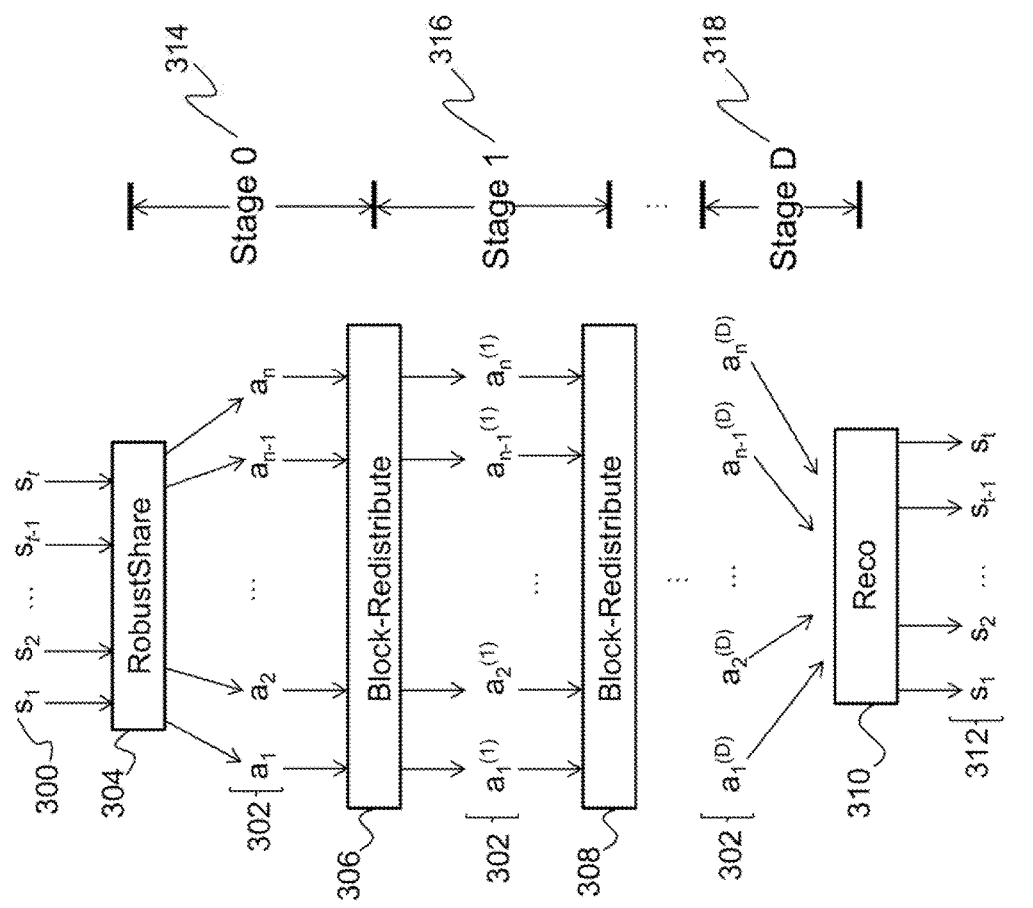
FIG. 3 is a flow chart illustrating a collection of protocols according to the principles of the present invention.

As shown in FIG. 3, the system according to the principles of the present invention incorporates a collection of protocols that implement mobile proactive secret sharing. The data to be stored is arranged in blocks of a specific size (defined later). A block of secret data (e.g., $S_1$ through $S_l$, 300) is distributed among a set of servers using a Robust-Share protocol 304. Each server in the set of servers holds one share of data encoding the block of secrets. For instance, server $P_i$'s share during a stage k is $\alpha_i^{(k)}$. Some of the set of servers may be corrupted by a malicious party, called an adversary. While in practice, there may be more than one malicious party corrupting players, for the purposes of this application it is assumed that there is one malicious party.

To protect against the adversary, the servers periodically "refresh" their shares so that each server holds a new share of the same block of data that is independent of the previous share. The refreshing is implemented using a Block-Redistribute protocol. As shown in FIG. 3, the protocol may include a first invocation of a Block-Redistribute protocol 306 and a second invocation of a Block-Redistribute protocol 308 (or additional consecutive invocations of Block-Redistribute protocols). The set of servers engaged in the protocol and the number of servers, n, may change at each redistribution. The set of servers may simply store their shares of the data, or they may perform some linear operations on their shares. Once the data needs to be accessed, the set of servers runs a Reco (i.e., reconstruct) protocol 310 to reveal a set of secret data 312.

A set of servers $\mathcal{P}$ store data represented in some finite field $\mathbb{F}$. The set of servers $\mathcal{P}$ may change over the course of the entire protocol. The shares of the data will be redistributed periodically. The period between consecutive redistributions (e.g., between the first Block-Redistribute protocol 306 and the second Block-Redistribute protocol 308) is called a stage (e.g., stage 0 represented by element 314, stage 1 represented by element 316, stage D represented by element 318). Additionally, the period before the first Block-Redistribute protocol is a stage (e.g., stage 0, 314), and the period after the last redistribution is a stage (e.g., stage D, 318). Stages are defined such that the redistribution (e.g., the first Block-Redistribute protocol 306) itself is considered to be in both the stage before and after the redistribution. Referring to FIG. 3, the first Block-Redistribute protocol 306 redistribution is in both stage 0 (element 314) and stage 1 (element 316).

Let n denote the number of servers and denote the set of servers by $\mathcal{P} = \{P_i\}_{i=1}^{n}$. n was allowed to fluctuate throughout the course of the protocol. Let t denote the threshold of corruption (i.e., the maximum number of servers the adversary may corrupt during the current stage of operation of the protocol). It is assumed that an active adversary may adaptively corrupt and de-corrupt servers at will, so long as the number of corruptions per stage does not exceed the threshold. Any server that is corrupt during a secret redistribution is considered to be corrupt in both adjacent stages. It is required that t<n/16 at each stage. Without loss of generality, n=16t+1 was set. Let Corr denote the set of servers believed to be (possibly) corrupt. Throughout the protocol, whenever one server accuses another of bad behavior, both servers will be added to Corr. It is assumed initially that Corr=$\emptyset$. Further, a synchronous network model with private point-to-point channels and a secure, authenticated broadcast channel is assumed. These terms are defined in, for instance, chapter 7 of Literature Reference No. 15.

The MPSS protocol according to the principles of the present invention uses batched secret sharing (see Literature Reference No. 12). The secrets are stored in blocks of size l, where l is the highest power of 2 not greater than n/4. The secrets are stored as follows: Fix some generator $\zeta$ of $\mathbb{F}^*$. Each block of l secrets 14/42 is stored in a polynomial H of degree$\leq$d=l+2t−1. The polynomial H is chosen such that $H(\zeta^j)$ is the $j^{th}$ secret for j=1, . . . , l and $H(\zeta^{l+j})$ is uniformly random for j=1, . . . , 2t.

In the context of redistributing shares from one group to another, the labels n, t, and d (as described above) are used for the old group, and the labels n', t', and d' are used for the corresponding variables in the new group. It is assumed that t will increase or decrease by a factor of no more than 2 at each redistribution (i.e., t/2$\leq$t'$\leq$2t), depicted as elements 306 and 308 in FIG. 3. The old group is denoted by $\mathcal{P} = \{P_i\}_{i=1}^{n}$ and the new group by $\mathcal{P}' = \{P'_j\}_{j=1}^{n'}$. $\alpha_i$ is used to denote the evaluation point of $P_i$ and $\beta_j$ to denote the evaluation point of $P'_j$. The protocol described herein requires that $\alpha_i \neq \beta_j$ for all i,j (unless $P_i = P'_j$). Furthermore, it is required that no $\alpha_i$ or $\beta_j$ is equal to $\zeta^j$ for any j=1, . . . l+2t, because, otherwise, the corresponding server might learn one of the data points.

The redistribution protocol (i.e., Block-Redistribute protocol 306, 308) is written in such a way that $\mathcal{P}$ and $\mathcal{P}'$ contain no servers in common. However, the protocol can be adapted so that the sets can overlap as follows: Each server $P_i$ in $\mathcal{P}$ is given a new identity $P'_j \in \mathcal{P}'$. The real server plays the part of both identities during redistribution. Once the redistribution protocol is complete, the real server deletes all data associated with $P_i$, and then proceeds to act as $P'_j$. Provided below is a table illustrating symbols as used in the protocol according to the principles of the present invention.

Table of Symbols Used in Protocol Description

| | |
|---|---|
| $\mathcal{P}$ | The set of servers on-line and engaged in the protocol in the current stage. |
| n | The number of servers engaged in the protocols in the current stage. |
| t | The maximum number of servers that a malicious party can corrupt without revealing the secret. This is called the threshold of corruption. |
| d | The degree of the polynomials used to share the secrets. |
| $\mathcal{P}$, n', t', d' | Same as above, except that these are for the new set of servers for the next stage. |
| Corr | A publicly known set of servers which are possibly corrupt. |
| $P_i$ | The server with index i in $\mathcal{P}$. |
| $\alpha_i$ | The evaluation point of server of Pi. This determines which share of the secret Pi will get. |
| $P'_j$ | A server in $\mathcal{P}$. |
| $\beta_j$ | The evaluation point of server $S_j$. |

The MPSS protocol according to the principles of the present invention requires the use of a hyper-invertible matrix (see Literature Reference No. 5). A hyper-invertible matrix is such that any square sub-matrix formed by removing rows and/or columns is invertible. It is shown in Literature Reference No. 5 that one can construct an a×b hyper-invertible matrix M as follows: Pick a+b distinct field elements $\theta_1, \ldots, \theta_a, \Phi_1, \ldots, \Phi_b \in \mathbb{F}$ and let M be the matrix such that if $(\gamma_1, \ldots, \gamma_a)^T = M(x_1, \ldots, x_b)^T$, then the points $(\theta_1, \gamma_1), \ldots, (\theta_a, \gamma_a)$ lie on the polynomial of degree≤b−1 which evaluates to $x_j$ at $\Phi_j$ for each j=1, ..., b. In other words, M interpolates the points $\theta_1, \ldots, \theta_a$ on a polynomial given the points $\Phi_1, \ldots, \Phi_b$ on that polynomial. Many of the sub-protocols assume the existence of a publicly known hyper-invertible matrix, and the dimension of the required matrix may be different for different protocols. Since it follows readily from the definition that any sub-matrix of a hyper-invertible matrix is also hyper-invertible, one can construct one publicly known hyper-invertible matrix of size n×n at each redistribution and use sub-matrices of this matrix whenever one needs a hyper-invertible matrix of a particular size. Since the size of hyper-invertible matrices needed will never be more than n×n, one can construct any hyper-invertible matrix one needs from this one matrix. Although n may change throughout the protocol, assuming there is an upper bound on n, the matrix can be constructed for this maximal n.

One algorithm which is used repeatedly in the redistribution protocol (elements 306 and 308) is the Berlekamp-Welch algorithm (see Literature Reference No. 2 for a discussion of the Berlekamp-Welch algorithm). If a server is given points on a polynomial (such as shares of a block of secrets) and some of the points have been corrupted (such as when corrupt servers alter their shares), the Berlekamp-Welch algorithm allows the server to correctly interpolate the polynomial despite the corrupted points. The basic outline of the algorithm is as follows: Suppose the server wants to interpolate a polynomial P. The server receives a vector of shares $(\gamma_1, \ldots, \gamma_n)$, where each honest $P_i$ sent $\gamma_i = P(\alpha_i)$ (although there are some i such that $\gamma_i \neq P(\alpha_i)$) for the polynomial P that the server is trying to interpolate. Denote the set of all i such that $\gamma_i \neq P(\alpha_i)$ by I. Define a polynomial $E(x) = \Pi_{i \in I}(x - \alpha_i)$, and define another polynomial N=P·E. Note that the relation $N(\alpha_i) = \gamma_i E(\alpha_i)$ holds for all i=1, ..., n. These n relations are used to construct a matrix equation for the coefficients of N and E. The server solves this equation and then computes P by dividing N by E.

To perform basic tasks, such as secret sharing, generating random sharings, and opening secrets, three protocols are used from Literature Reference No. 7: the RobustShare protocol 304, the RanDouSha protocol, and the Reco protocol 310. For each of these protocols, the computational complexity is the communication complexity times a $\log^3 n$ factor. Each of these protocols is proved to be secure in Literature Reference No. 7:

RobustShare: Allows a set of dealers to verifiably share secrets in blocks. Communication complexity of sharing W secrets is $O(W+n^3)$.

RanDouSha: Generates random sharings of blocks of secrets. Communication complexity of generating W random secrets is $O(W+n^3)$.

Reco: Reveals a block of secrets to a server. Communication complexity of revealing W secrets is O(W).

(4.1) Redistribution

Described below is the Block-Redistribute protocol (elements 306 and 308) for redistributing W secrets that are block-shared among a server set $\mathcal{P}$ of size n to a new set of servers $\mathcal{P}'$ of size n'. For simplicity of notation, the protocol assumes that W is a multiple of $4l^2(n-3t)$. If W is not a multiple of $4l^2(n-3t)$, one can generate random sharings of blocks to make it so. Using RanDouSha from Literature Reference No. 7, this can be achieved with poly(n) communication complexity, and since it adds only a poly(n) amount of data to W, this does not affect the asymptotic communication complexity of redistributing W secrets.

Since the number of secrets is a multiple of $4l^2(n-3t)$, and since the secrets are stored in blocks of size l, the number of polynomials/sharings input to the protocol is a multiple of $4l(n-3t)$. The polynomials are arranged in groups of size l, and then these groups are arranged into "towers," where each tower contains n−3t groups. The total number of towers is denoted by B, so that $W=l^2(n-3t)B$ (where B is a multiple of 4). This means that the number of input polynomials is l(n−3t)B. These polynomials are indexed as $$\{H_a^{(k,m)}\} \begin{array}{l} m = 1, \ldots, B \\ k = 1, \ldots, n - 3t, \\ a = 1, \ldots, l \end{array}$$

where a indicates $H_a^{(k,m)}$'s location in the group, k indicates $H_a^{(k,m)}$'s group number within the tower, and m indicates $H_a^{(k,m)}$'s tower number.

If the size of the server set is changing (i.e., n≠n' and t≠t'), then the secrets stored in polynomials of degree d will have to be re-stored in polynomials of degree d'. A change in the server set size may also cause a change in the block size, l. Recall that l is the highest power of 2 not greater than n/4. So if n decreases from 64 to 63, then l will decrease from 16 to 15, but if n decreases from 63 to 62, then l will not change. A similar situation occurs if n is increasing. Therefore, there are a total of four situations that need to be considered: n increases and l stays the same; n increases and l increases; n decreases and l stays the same; and n decreases and l decreases. The protocol must be able to re-store the polynomials in any of these four cases, and the first step of the Block-Redistribute protocol (elements 306 and 308) describes how to do this.

For the protocol described herein, let M be some (publicly known (i.e., known to all servers)) hyper-invertible matrix with n rows and n−2t columns. Throughout the protocol, the Berlekamp-Welch algorithm is used to interpolate polynomials in the presence of corrupt shares introduced by the adversary. As was noted in Literature Reference No. 10, if M is as above and y=Mx, then one can also use Berlekamp-Welch to interpolate x from y if the adversary corrupts no more than t coordinates of y.

The protocol requires a slightly altered version of RanDouSha for step 2.1. In Literature Reference No. 7, RanDouSha calls on a sub-protocol SemiRobustShare, and in that protocol, step 2(a) is altered so that the servers check that the polynomials evaluate to zero at $\zeta^j$ for $j=1, \ldots, l$, and an accusation is broadcast if they do not. The security proof for this altered protocol is exactly the same as in Literature Reference No. 7. When the Block-Redistribute protocol (elements 306 and 308) is invoked, it is assumed that the servers have some means of knowing what the new set of servers will be. There are many methods of assuring this: they may have a schedule for which servers will be added that was fixed prior to protocol execution, they may decide by communicating with one another, or there may be some trusted third party (such as a network administrator) that provides the specification. This will ultimately depend on the intended application of this protocol.

(4.1.1) Block-Redistribute $$\{H_a^{(k,m)}\} \begin{matrix} m=1,\ldots,B \\ k=1,\ldots,n-3t \\ a=1,\ldots,l \end{matrix}$$

It is assumed that the secrets have been stored in blocks of size (as described above) in polynomials $H_a^{(k,m)}$. The Block-Redistribute protocol is represented by elements 306 and 308 in FIG. 3.

(1) Changing the Threshold

If $t \neq t'$, then one of steps 1.1 through 1.4 is performed.

(1.1) Lowering the Threshold, Block Size Stays the Same

If $t' < t$ and $l' = l$, then the following steps are performed.

(a) The servers invoke RanDouSha to generate tlB random masking polynomials $H_a^{(k,m)}$ of degree$\leq d$ for $k=n-3t+1, \ldots, n-2t$ (where a and m range over the same values as before).

(b) Define $\tilde{H}_a^{(k,m)}$ for $k=1, \ldots, n$ by $(\tilde{H}_a^{(1,m)}, \ldots, \tilde{H}_a^{(n,m)})^T = M(H_a^{(1,m)}, \ldots, H_a^{(n-2t,m)})^T$. Each server locally computes their shares of these polynomials and sends his share of each $\tilde{H}_a^{(j,m)}$ to server $P_j$.

(c) Each $P_i$ uses Berlekamp-Welch to interpolate $\tilde{H}_a^{(i,m)}$ from the shares received in the previous step.

(d) Each $P_i$ computes (shares of) the unique polynomial $\tilde{h}_a^{(i,m)}$ of degree$\leq d'$ that agrees with $\tilde{H}_a^{(i,m)}$ on the evaluation points $\zeta^1$ through $\zeta^{l+2n}$.

(e) Each $P_i$ sends each $\tilde{h}_a^{(i,m)}(\alpha_j)$ to each $P_j$.

(f) If $h_a^{(k,m)}$ is defined to be the unique polynomial of degree$\leq d'$ that agrees with $H_a^{(i,m)}$ on the evaluation points $\zeta^1$ through $\zeta^{l+2n}$, then it is clear that $(\tilde{h}_a^{(1,m)}, \ldots, \tilde{h}_a^{(n,m)})^T = M(h_a^{(1,m)}, \ldots, h_a^{(n-2t,m)})^T$. So each server uses Berlekamp-Welch to interpolate their shares of the $h_a^{(k,m)}$ from the shares of the $\tilde{h}_a^{(k,m)}$ received in the previous step.

(g) To simplify notation in the rest of the protocol, $H_a^{(k,m)} \leftarrow h_a^{(k,m)}$ is now relabeled for $a=1, \ldots, l$, $k=1, \ldots, n-3t$, and $m=1, \ldots, B$.

(1.2) Lowering the Threshold, Block Size Decreases

If $t' < t$ and $l' < l$, then the following steps are performed. Since it is assumed that the number of servers decreases by no more than a factor of 2, it is known that $l' < \frac{1}{2}$.

(a) The servers invoke RanDouSha to generate tlB random masking polynomials $H_a^{(k,m)}$ of degree$\leq d$ for $a=1, \ldots, l$ and $k=n-3t, \ldots, n-2t$, and $(n-2t)lB$ random polynomials $R_a^{(k,m)}$ of degree$\leq d$ for $a=1, \ldots, 2l$ and $k=1, \ldots, n-2t$ (where m ranges over the same values as before).

(b) Define $\tilde{H}_a^{(k,m)}$ for $k=1, \ldots, n$ by $(\tilde{H}_a^{(1,m)}, \ldots, \tilde{H}_a^{(n,m)})^T = M(H_a^{(1,m)}, \ldots, H_a^{(n-2t,m)})^T$, and similarly define $\tilde{R}_a^{(k,m)}$ for $k=1, \ldots, n$. Each server locally computes their shares of these polynomials and sends his share of each $\tilde{H}_a^{(j,m)}$ and $\tilde{R}_a^{(j,m)}$ to server $P_j$.

(c) Each $P_i$ uses Berlekamp-Welch to interpolate $\tilde{H}_a^{(i,m)}$ and $\tilde{R}_a^{(i,m)}$ from the shares received in the previous step.

(d) Each $P_i$ computes (shares of) the unique polynomials $\tilde{h}_{2a-1}^{(i,m)}, \tilde{h}_{2a}^{(i,m)}$ of degree$\leq d'$ for $a=1, \ldots, l$ and $m=1, \ldots, B$ that satisfy the following:
$\tilde{h}_{2a-1}^{(i,m)}(\zeta^j) = \tilde{H}_a^{(i,m)}(\zeta^j)$ for $j=1, \ldots, l'$.
$\tilde{h}_{2a-1}^{(i,m)}(\zeta^{l'+j}) = \tilde{R}_{2a-1}^{(i,m)}(\zeta^j)$ for $j=1, \ldots, 2t'$.
$\tilde{h}_{2a}^{(i,m)}(\zeta^j) = \tilde{H}_a^{(i,m)}(\zeta^{l'+j})$ for $j=1, \ldots, l'$.
$\tilde{h}_{2a}^{(i,m)}(\zeta^{l'+j}) = \tilde{R}_{2a}^{(i,m)}(\zeta^j)$ for $j=1, \ldots, 2t'$.

(e) Each $P_i$ sends each $\tilde{h}_a^{(i,m)}(\alpha_j)$ to each $P_j$.

(f) If $h_a^{(k,m)}$ is defined to be the unique polynomials of degree$\leq d'$ satisfying
$h_{2a-1}^{(k,m)}(\zeta^j) = H_a^{(k,m)}(\zeta^j)$ for $j=1, \ldots, l'$.
$h_{2a-1}^{(k,m)}(\zeta^{l'+j}) = R_{2a-1}^{(k,m)}(\zeta^j)$ for $j=1, \ldots, 2t'$.
$h_{2a}^{(k,m)}(\zeta^j) = H_a^{(k,m)}(\zeta^{l'+j})$ for $j=1, \ldots, l'$.
$h_{2a}^{(k,m)}(\zeta^{l'+j}) = r_{2a}^{(k,m)}(\zeta^j)$ for $j=1, \ldots, 2t'$. then it is clear that $(\tilde{h}_a^{(1,m)}, \ldots, \tilde{h}_a^{(n,m)})^T = M(h_a^{(1,m)}, \ldots, h_a^{(n-2t,m)})^T$. So each server uses Berlekamp-Welch to interpolate their shares of the $h_a^{(k,m)}$ from the shares of the $\tilde{h}_a^{(k,m)}$ received in the previous step.

(g) Place a lexicographical order on the polynomials $H_a^{(k,m)}$ by assigning to the polynomial the vector (m, k, a) and using the lexicographical order on these three-dimensional vectors to induce an ordering on the polynomials. Similarly, a lexicographical order is placed on the polynomials $h_a^{(k,m)}$. To simplify notation throughout the rest of the protocol, $$\{H_a^{(k,m)}\} \begin{matrix} m=1,\ldots,4B \\ k=1,\ldots,n-3t \\ a=1,\ldots,l' \end{matrix} \leftarrow \{h_a^{(k,m)}\} \begin{matrix} m=1,\ldots,B \\ k=1,\ldots,n-3t \\ a=1,\ldots,2l \end{matrix}$$

is relabeled in such a way that this map preserves lexicographical order. $B \leftarrow 4B$ is then relabeled.

(1.3) Raising the Threshold, Block Size Stays the Same

If $t' > t$ and $l' = l$, then the following steps are performed.

(a) The servers invoke RanDouSha to generate tlB random masking polynomials $H_a^{(k,m)}$ of degree$\leq d$ for $k=n-3t+1, \ldots, n-2t$ (where a and m range over the same values as before).

(b) The servers invoke RanDouSha to generate (n−2t)lB random polynomials $R_a^{(k,m)}$ of degree$\leq d'$ for $k=1, \ldots, n-2t$ (where a and m range over the same values as before).

(c) Define $\tilde{H}_a^{(k,m)}$ for $k=1, \ldots, n$ by $(\tilde{H}_a^{(1,m)}, \ldots, \tilde{H}_a^{(n,m)})^T = M(H_a^{(1,m)}, \ldots, H_a^{(n-2t,m)})^T$, and similarly define $\tilde{R}_a^{(k,m)}$ for $k=1, \ldots, n$. Each server locally computes their shares of these polynomials and sends his share of each $\tilde{H}_a^{(j,m)}$ and $\tilde{R}_a^{(j,m)}$ to server $P_j$.

(d) Each $P_i$ uses Berlekamp-Welch to interpolate $\tilde{H}_a^{(i,m)}$ and $\tilde{R}_a^{(i,m)}$ from the shares received in the previous step.

(e) Each $P_i$ computes (shares of) the unique polynomials $\tilde{h}_a^{(i,m)}$ of degree$\leq$d' that agrees with $\tilde{H}_a^{(i,m)}$ on the points $\zeta^1$ through $\zeta^l$ and agrees with $\tilde{R}_a^{(i,m)}$ on the points $\zeta^{l+1}$ through $\zeta^{l+2t_l}$.

(f) Each $P_i$ sends each $\tilde{h}_a^{(i,m)}(\alpha_j)$ to each $P_j$.

(g) If $h_a^{(i,m)}$ is defined to be the unique polynomial of degree$\leq$d' that agrees with $H_a^{(i,m)}$ on the points $\zeta^1$ through $\zeta^l$ and agrees with $R_a^{(i,m)}$ on the points $\zeta^{l+1}$ through $\zeta^{l+2t_l}$, then it is clear that $(\tilde{h}_a^{(1,m)}, \ldots, \tilde{h}_a^{(n,m)})^T = M(h_a^{(1,m)}, \ldots, h_a^{(n-2t,m)})^T$ So each server uses Berlekamp-Welch to interpolate their shares of the $h_a^{(k,m)}$ from the shares of the $\tilde{h}_a^{(k,m)}$ received in the previous step.

(h) To simplify notation in the rest of the protocol, $H_a^{(k,m)} \leftarrow h_a^{(k,m)}$ is now relabeled for a=1, ..., l, k=1, ..., n−3t, and m=1, ..., B.

(1.4) Raising the Threshold, Block Size Increases

If t'>t and l'>1, then the following steps are performed. Since it is assumed that the number of servers increases by no more than a factor of 2, it is known that l'=2l.

(a) The servers invoke RanDouSha to generate tlB random masking polynomials $H_a^{(k,m)}$ of degree$\leq$d for k=n−3t+1, ..., n−2t (where a and m range over the same values as before).

(b) The servers invoke RanDouSha to generate (n−2t)lB/2 random polynomials $R_a^{(k,m)}$ of degree$\leq$d' for k=1, ..., n−2t, a=1, ..., l/2, and m 32 1, ..., B.

(c) Define $\tilde{H}_a^{(k,m)}$ for k=1, ..., n by $(\tilde{H}_a^{(1,m)}, \ldots, \tilde{H}_a^{(n,m)})^T = M(H_a^{(1,m)}, \ldots, H_a^{(n-2t,m)})^T$ and similarly define $\tilde{R}_a^{(k,m)}$ for k=1, ..., n. Each server locally computes their shares of these polynomials and sends his share of each $\tilde{H}_a^{(j,m)}$ and $\tilde{R}_a^{(j,m)}$ to server $P_j$.

(d) Each $P_i$ uses Berlekamp-Welch to interpolate the shares of $\tilde{H}_a^{(i,m)}$ and $\tilde{R}_a^{(i,m)}$ received in the previous step.

(e) Each $P_i$ computes (shares of) the unique polynomials $\tilde{h}_a^{(i,m)}$ of degree$\leq$d' for a=1, ..., l/2 and m=1, ..., B that satisfy the following:
$\tilde{h}_a^{(i,m)}(\zeta^j) = \tilde{H}_{2a-1}^{(i,m)}(\zeta^j)$ for j=1, ..., l.
$\tilde{h}_a^{(i,m)}(\zeta^{l+j}) = \tilde{H}_{2a}^{(i,m)}(\zeta^j)$ for j=1, ..., l.
$\tilde{h}_a^{(i,m)}(\zeta^{l'+j}) = \tilde{R}_a^{(i,m)}(\zeta^j)$ for j=1, ..., 2t'.

(f) Each $P_i$ sends each $\tilde{h}_a^{(i,m)}(\alpha_j)$ to each $P_j$.

(g) If $h_a^{(k,m)}$ is defined to be the unique polynomials of degree$\leq$d' satisfying
$h_a^{(k,m)}(\zeta^j) = H_{2a-1}^{(k,m)}(\zeta^j)$ for j=1, ..., l.
$h_a^{(k,m)}(\zeta^{l+j}) = H_{2a}^{(k,m)}(\zeta^j)$ for j=1, ..., l.
$h_a^{(k,m)}(\zeta^{l'+j}) = R_a^{(k,m)}(\zeta^{l'+j})$ for j=1, ..., 2t', then it is clear that $(\tilde{h}_a^{(1,m)}, \ldots, \tilde{h}_a^{(n,m)})^T = M(h_a^{*1,m}, \ldots, h_a^{(n-2t,m)})^T$ So each server uses Berlekamp-Welch to interpolate their shares of the $h_a^{(k,m)}$ from the shares of the $\tilde{h}_a^{(k,m)}$ received in the previous step.

(h) A lexicographical order is placed on the polynomials $h_a^{(k,m)}$ by assigning to the polynomial the vector (m, k, a) and using the lexicographical order on these three-dimensional vectors to induce an ordering on the polynomials. Similarly, a lexicographical order is placed on the polynomials $h_a^{(k,m)}$. To simplify notation throughout the rest of the protocol, $$\{H_a^{(k,m)}\} \begin{array}{l} m=1, \ldots, B/4 \\ k=1, \ldots, n-3t \\ a=1, \ldots, l' \end{array} \leftarrow \{h_a^{(k,m)}\} \begin{array}{l} m=1, \ldots, B \\ k=1, \ldots, n-3t \\ a=1, \ldots, l/2 \end{array}$$

is now relabeled in such a way that this map preserves lexicographical order. B←B/4 is then relabeled.

(2) Double Sharing Block-Shared Secrets (2.1) The servers in $\mathcal{P}$ invoke RanDouSha to generate l'(n−3t)B masking polynomials $Q_a^{(k,m)}$ of degree$\leq$d' for each a=1, ..., l', k=1, ..., n−3t, and m=1, ..., B satisfying $Q_a^{(k,m)}(\zeta^j)=0$ for j=1, ..., l'.

(2.2) The servers locally add the shares of the masking polynomials to the shares of their block-shared secrets. $H_a^{(k,m)} \leftarrow H_a^{(k,m)} + Q_a^{(k,m)}$ is relabeled to denote these re-randomized sharings.

(2.3) All servers erase their shares of each $Q_a^{(k,m)}$ and of the original $H_a^{(k,m)}$ (but keep shares of the new ones).

(2.4) The servers use RanDouSha to generate an additional tl'B random polynomials $H_a^{(k,m)}$ where a=1, ..., l' and m=1, ..., B as before, but k=n−3t+1, ..., n−2t.

(2.5) Each server block-shares all of his shares of each $H_a^{(k,m)}$ using RobustShare. That is, $P_i$ chooses polynomials $U^{(i,1,m)}, \ldots, U^{(i,(n-2t),m)}$ of degree$\leq$d' such that $U^{(i,k,m)}(\zeta^a) = H_a^{(k,m)}(\alpha_i)$ for a=1, ..., l', k=1, ..., n−2t, and m=1, ..., B and shares them via RobustShare.

(3) Verifying Correctness (3.1) Define $\tilde{H}_a^{(\tilde{k},m)}$ and $\tilde{U}^{(i,\tilde{k},m)}$ for $\tilde{k}$=1, ..., n by $(\tilde{H}_a^{(1,m)}, \ldots, \tilde{H}_a^{(n,m)})^T = M(H_a^{(1,m)}, \ldots, H_a^{(n-2t,m)})^T$ and $(\tilde{U}^{(i,1,m)}, \ldots, \tilde{U}^{(i,n,m)})^T = M(U^{(i,1,m)}, \ldots, U^{(i,n-2t,m)})^T$. Each server in $\mathcal{P}$ locally computes their shares of these polynomials.

(3.2) Each server in $\mathcal{P}$ sends all their shares of $\tilde{H}_a^{(\tilde{k},m)}$ and $\tilde{U}^{(i,\tilde{k},m)}$ to server $P_{\tilde{k}}$ for each a, i, and m.

(3.3) Each $P_{\tilde{k}}$ uses Berlekamp-Welch on the shares of each $\tilde{U}^{(i,\tilde{k},m)}$ to interpolate $\tilde{U}^{(i,\tilde{k},m)}(\zeta^a)$ for each a=1, ..., l'.

(3.4) Each $P_{\tilde{k}}$ uses Berlekamp-Welch on the shares of each $\tilde{H}_a^{(\tilde{k},m)}$ to interpolate $\tilde{H}_a^{(\tilde{k},m)}$ for each i=1, ..., n.

(3.5) Each $P_{\tilde{k}}$ checks if the shares of $\tilde{H}_a^{(\tilde{k},m)}$ are consistent with the interpolation of the polynomial $\tilde{U}^{(i,\tilde{k},m)}$. That is, $P_{\tilde{k}}$ checks if $\tilde{U}^{(i,\tilde{k},m)}(\zeta^a) = \tilde{H}_a^{(\tilde{k},m)}(\alpha_i)$ for each a=1, ..., l'. If some $\tilde{U}^{(i,\tilde{k},m)}$ does not pass this check, then $P_{\tilde{k}}$ broadcasts $(P_{\tilde{k}}, J'$ accuse, $P_i)$. Whenever a server receives an accusation, both the accuser and the accused are added to Corr. (After a server is added to Corr, any further accusations from that server are ignored.)

(3.6) Each server erases all their shares of each $\tilde{H}_a^{(\tilde{k},m)}$ and $\tilde{U}^{(i,\tilde{k},m)}$ for $\tilde{k}$=1, ..., n and $H_a^{(k,m)}$ and $U^{(i,k,m)}$ for k=n−3t+1, ..., n−2t.

(4) Share Redistribution (4.1) Define G to be the set of the first n−2t servers in $\mathcal{P}$−Corr. Let $\{z_1, \ldots, z_{n-2t}\}$ denote the set of indices of servers in G. Let $\lambda_{j,i}$ denote the Lagrange coefficients for interpolating $P'_j$'s share of a secret from the shares of servers in G (i.e., for a polynomial f of degree$\leq$d', $f(\beta_j) = \lambda_{j,1} f(\alpha_{z_1}) + \ldots + \lambda_{j,n-2t} f(\alpha_{z_{n-2t}})$.)

(4.2) For each k=1, ..., n−3t, each m=1, ..., B and each j=1 ..., n', each server in G sends his share of $\lambda_{j,1} U^{(z_1,k,m)} + \ldots + \lambda_{j,n-2t} U^{(z_{n-2t},k,m)}$ to $P'_j$.

(4.3) Each $P'_j \in \mathcal{P}'$ uses Berlekamp-Welch to interpolate the polynomials received in the previous step. Note that for each a=1, ..., l', $$\lambda_{j,1} U^{(z_1,k,m)}(\zeta^a) + \ldots + \lambda_{j,n-2t} U^{(z_{n-2t},k,m)}(\zeta^a) =$$
$$\lambda_{j,1} H_a^{(k,m)}(\alpha_{z_1}) + \ldots + \lambda_{j,n-2t} H_a^{(k,m)}(\alpha_{z_{n-2t}}) = H_a^{(k,m)}(\beta_j).$$

Thus, $P'_j$ has his share of each block of data.

(4.4) Each server erases all their shares of each $U^{(i,k,m)}$ (retaining the shares of $H_a^{(k,m)}$).

(4.5) Set Corr=∅.

The protocol Block-Redistribute (elements 306 and 308) has communication complexity $O(W+n^3)$. The computational complexity is the communication complexity times a login factor.

(4.2) Player Virtualization in a Constant Number of Rounds

The Block-Redistribute protocol (elements 306 and 308) according to the principles of the present invention has a low threshold of corruption. In order to increase it, server visualization is used (Literature Reference No. 4). The servers in the above protocol are replaced with committees of servers so that there are fewer corrupt committees than there are corrupt servers.

The result of Literature Reference No. 4 is non-constructive in that the committees are chosen randomly; it is shown that with high probability the random choices will lead to a good selection of committees. The technique of Literature Reference No. 4 was made constructive in Literature Reference No. 7.

As described in Literature Reference No. 7, it is assumed that there are n servers. For any $0<\epsilon, \delta<1$, there exists a construction of n committees of size $s=O(1/\delta\epsilon^2)$ such that if no more than $$\left(\frac{1}{2} - \epsilon\right)n$$

of the servers are corrupt, then no more than $\delta \cdot n$ committees will be corrupt (where a committee is corrupt if s/2 or more of its members are corrupt). The members of the committees can be computed in time·polylog n. According to the principles of the present invention, the threshold of corruption t is ⅓−ϵ, where ϵ is an arbitrary positive constant. Provided that the adversary corrupts no more than a ⅓−ϵ fraction of the set of servers, then the system maintains its security.

For the protocol described herein, committees of size s are used such that if c is the number of corrupt servers in a committee, then c<s/3 means that the committee is "good" (as in Literature Reference No. 8). Since the goal of the redistribution protocol according to the principles of the present invention is to have perfect security, the inner protocol must have perfect security. Additionally, all of the sub-protocols must take a constant number of rounds, so the inner protocol must take a constant number of rounds (per multiplication). The BGW protocol is used (described in Literature Reference No. 3) for the inner protocol, since it satisfies both of these properties.

The value of e can be determined by the end user. Since the redistribution protocol have been constructed to work with a threshold of t<n/16, there is δ=1/16.

When virtualization is used and each server is replaced by a committee, communication between two servers is replaced by communication between two committees. In addition, internal computations must be simulated by multi-party computation among the committee. It is clear that there are only a few types of computations that need to be performed throughout the entire protocol: addition, multiplication of two private values, multiplication of a vector of shares by a publicly known hyper-invertible matrix, and the Berlekamp-Welch algorithm. Communication between committees and each type of internal computation is discussed individually below.

Suppose one committee wants to send a secret value to another committee. Denote the servers in the sending committee by $p_1^{send}, \ldots, p_s^{send}$ and the servers in the receiving committee by $p_1^{rec}, \ldots, p_s^{rec}$. Denote the evaluation point of $p_j^{send}$ and $p_j^{rec}$ $\gamma_j$. So each $p_j^{send}$ holds a share $f_0(\gamma_j)$ of some polynomial $f_0$, where $f_0(0)$ is the secret to be transmitted. The sending servers generate c random polynomials of degree≤c, which are labeled $f_1, \ldots, f_c$. A description of how to generate these polynomial is given in Literature Reference No. 3. Then, each server in the sending committee sends his share of $f_0+\gamma_j f_1+\ldots+\gamma_j^c f_c$ to server $p_j^{rec}$, who then uses the Berlekamp-Welch algorithm to interpolate the polynomial. The constant term of this polynomial is recorded as $p_j^{rec}$'s share of the secret. Each server in the receiving committee now holds a share of the polynomial $f_0(0)+xf_1(0)+\ldots+x^c f_c(0)$, and the constant term of this polynomial is the secret. Thus, the transmission is complete. Note that it is much simpler for a committee to broadcast a value to all other committees, because then each member of the committee simply broadcasts his share of the secret. Additions are performed simply by adding shares as specified in the BGW protocol.

The only situation in which a committee needs to multiply two private values is when the committee needs to multiply two of its shares; this only occurs in the Multiply protocol. These multiplications will be handled as specified in the BGW protocol. Since the committee size is constant, this only requires a constant amount of computation per multiplication. Examining the BGW protocol, each multiplication requires seven communication rounds and six broadcast rounds.

In order to reduce the number of broadcasts used in the main protocol, all the broadcasts in the multiplication sub-protocol will be implemented with point-to-point channels using a broadcast protocol. The minimum number of rounds to implement a (deterministic) broadcast protocol for a committee with at most c corrupt servers is c+1 (see Literature Reference No. 11). Since c is a constant that depends on ϵ, the protocol according to the principles of the present invention will work in a constant number of rounds. Any broadcast protocol that achieves the c+1 lower bound on the number of rounds and has communication and computational complexity polynomial in the number of committee members will work. For instance, as a non-limiting example, the protocol described in Literature Reference No. 14 may be used. This results in a total of 7+6(c+1)=13+6c rounds of communication per multiplication.

Multiplication by hyper-invertible matrices can be done efficiently in committees. Each committee member simply performs the required operations on their shares. Each hyper-invertible matrix in the redistribution protocol according to the principles of the present invention has dimension $\Theta(n)$ by $\Theta(n)$. Normally, such a computation would require $\Theta(n^2)$ multiplications. However, since the hyper-invertible matrices model polynomial interpolation and evaluation, one can use efficient algorithms from the computer science literature. For instance, Literature Reference No. 1 can be used to do these computations with only $O(n \log^3 n)$ multiplications.

The application of the Berlekamp-Welch algorithm in committees requires some care, because a straightforward application of the BGW protocol would lead to non-constant round complexity. The Berlekamp-Welch algorithm can be performed with $O(n \log^3(n))$ computational complexity (see Literature Reference No. 13). This adds a log³(n) factor to the computational complexity, which is not problematic. However, it requires O(polylog(n)) rounds of communication, and the redistribution protocol must work in a constant number of rounds.

An alteration of the Berlekamp-Welch algorithm was constructed for committees that has constant round complexity. This requires generating extra masking randomness. In fact, for each polynomial to interpolate, an additional c polynomials must be generated. However, the committee size is fixed throughout the protocol (as it only depends on $\epsilon$). Therefore, generating these extra sharings does not affect the asymptotic complexity of the protocol.

When the Block-Redistribute protocol (elements 306 and 308) is virtualized, each execution of the Berlekamp-Welch algorithm is replaced with an execution of the protocol Committee-BW described below. The protocol uses RanDouSha as a sub-protocol to generate random masking polynomials. The number of polynomials generated and the degrees of the polynomials will be different in different steps. For every polynomial the servers want to interpolate, they generate c masking polynomials of the same degree. Again, this does not add to the overall communication complexity of the protocol since c is constant once $\epsilon$ is decided. Note that in some instances, a server/committee is not interpolating a polynomial, but rather a vector generated by a hyper-invertible matrix. However, since the hyper-invertible matrices used model polynomial interpolation, such a vector can be seen as a set of evaluation points on a polynomial.

The protocol Committee-BW implements a committee performing Berlekamp-Welch in a constant number of rounds. $\mathcal{P}=\{P_i\}_{i=1}^n$ is used to denote the set of committees and Com=$\{p_j\}_{j=1}^s$ to denote the committee that is to perform Berlekamp-Welch. The evaluation point of $P_i$ is $\alpha_i$ and the evaluation point of $p_j$ is $y_j$. It is assumed that the polynomial f to be interpolated has already been sent to the committee. This means that each share $f(\alpha_i)$ is Shamir-shared among the committee as a polynomial $f(\alpha_i)$ of degree no more than c such that $f_{\alpha_i}(0)=f(\alpha_i)$. Furthermore, the committee holds an additional c polynomials, $r^{(1)}, \ldots, r^{(c)}$, shared with polynomials $r_{\alpha_i}^{(k)}$ of degree no more than c such that $r_{\alpha_i}^{(k)}(0)=r^{(k)}(\alpha_i)$. The protocol uses an s by c+1 hyper-invertible matrix M', which is publicly known and fixed throughout all protocols.

Committee-BW (c, Com, $\{f_{\alpha_i}\}_{i=1}^n$)
1. The committees invoke RanDouSha to generate random polynomials $r^{(k)}$ for k=1, . . . , c.
2. Each committee sends its shares of each $r^{(k)}$ to Com. Define $r_{\alpha_i}^{(k)}$ as described above.
3. Define polynomials $u^{(1)}, \ldots, u^{(s)}$ by $(u^{(1)}, \ldots, u^{(s)})^T = M'(f, r^{(1)}, \ldots, r^{(c)})^T$. Similarly, define $(u_{\alpha_i}^{(1)}, \ldots, u_{\alpha_i}^{(s)})^T = M'(f_{\alpha_i}, r_{\alpha_i}^{(1)}, \ldots, r_{\alpha_i}^{(c)})^T$ for each $P_i$. Each $p_j$ locally computes his share of each $u_{\alpha_i}^{(k)}$.
4. Each $p_j$ sends his share of $u_{\alpha_i}^{(k)}$ to $p_k$ for each $P_j$.
5. Each $p_j$ uses Berlekamp-Welch to interpolate $u_{\alpha_i}^{(k)}$ (and hence $u^{(k)}(\alpha_i)$) from the shares received in the previous step.
6. Each $p_j$ uses Berlekamp-Welch to interpolate $u^{(k)}$, noting which shares he believes to be incorrect.
7. Each $p_j$ sends to each member of Com the index of each committee $P_i$ which he believes to have sent an incorrect share (these are called "negative votes").
8. For each $\alpha_i$ that received more than c negative votes in the previous step, the committee Com concludes that committee $P_i$ is corrupt, and his share of f is unneeded (even if the value of $f(\alpha_i)$ sent by $P_i$ was correct). Let I be the set of all i such that $P_i$ was not deemed to be corrupt.
9. Suppose the committee wants to interpolate a set of points $\xi_1, \ldots \xi_m$. Let $\{\lambda_i^{(k)}\}_{i \in I}$ denote the Lagrange coefficients for interpolating the point $\xi_k$ on a polynomial using the points $\{\alpha_i\}_{i \in I}$. Each $p_j$ locally computes his share of $f(\xi_k)$ for each k=1, . . . , m by $$f_{\xi_k}(\gamma_j) = \sum_{i \in I} \lambda_i^{(k)} f_{\alpha_i}(\gamma_j).$$

Invoking Committee-BW Win times in parallel has communication complexity O(W+poly(n)) (assuming the committee wants to interpolate O(n) points per invocation, which will always be the case in the execution of the protocol). It takes a constant number of communication rounds.

Mobile proactive sharing based on the system according to the principles of the present invention enables the storing of information in a secure, distributed fashion in a hostile environment where the storage platforms may change dynamically over time. Applications include, but are not limited to, storage of data in a distributed fashion over civilian vehicles, unmanned aerial vehicles (UAVs), and other platforms. Additionally, the system described herein can be used as a means of securing cell phone data. For instance, certain smart phone applications store sensitive information, such as cell phone data. The system according to the principles of the present invention can secure this data by dynamically spreading it to all cell phones in the area. The group of nearby cell phones changes dynamically, and as long as less than 30% of the cell phones are compromised, data security and integrity is maintained.

What is claimed is:

1. A system for proactive secret sharing amongst a plurality of mobile storage platforms, the system comprising:
one or more processors and a non-transitory computer-readable medium having executable instructions encoded thereon such that when executed, the one or more processors perform operations of:
initializing a RobustShare protocol to distribute a block of secret data among a set of servers comprising n servers of a synchronous network, a plurality of the n servers each being part of a mobile storage platform, wherein the block of secret data comprises a plurality of shares of data, wherein each server in the set of servers holds one share of data encoding the block of secret data, and wherein the plurality of shares of data is transmitted electronically via a secure, authenticated broadcast channel;
initializing at least one Block-Redistribute protocol to protect against at least one adversary that attempts to corrupt the set of servers, wherein during a Block-Redistribute protocol the set of servers periodically refreshes its plurality of shares of data such that each server holds a new share of data that is independent of the previous share of data;
initializing a Reco protocol to reveal the block of secret data,
wherein a communication complexity for each of the protocols is $O(W+n^3)$, where W denotes a number of secrets and O represents big O notation; and
periodically erasing, by each server, the plurality of shares of data to preserve security against an adversary.

2. The system as set forth in claim 1, wherein the block of secret data is of size l, wherein l is the highest power of 2 not greater than n/4, and wherein each block of secret data is stored in a polynomial H of degree$\leq$d=l+2t−1, where t denotes a threshold of corruption defines a maximum number of servers the at least one adversary may corrupt.

3. The system as set forth in claim 2, wherein n can increase or decrease by a factor of two at each Block-Redistribute protocol regardless of t.

4. The system as set forth in claim 3, wherein the system provides perfect security, such that provided that the at least one adversary does not corrupt more than t servers, the probability of the at least one adversary compromising the privacy or correctness of the block of secret data is zero.

5. The system as set forth in claim 4, wherein the threshold of corruption t is $\frac{1}{3}-\epsilon$, where $\epsilon$ is an arbitrary positive constant, wherein provided that the at least one adversary corrupts no more than a $\frac{1}{3}-\epsilon$ fraction of the set of servers, then the system maintains its security.

6. The system as set forth in claim 1, wherein the at least one mobile storage platform has a secure erasure feature.

7. The system as set forth in claim 1, wherein a plurality of the mobile storage platforms are cell phones.

8. The system as set forth in claim 1, wherein as plurality of the mobile storage platforms are vehicles.

9. A computer-implemented method for proactive secret sharing amongst a plurality of mobile storage platforms, comprising:
an act of causing a data processor to execute instructions stored on a non-transitory memory such that upon execution, the data processor performs operations of:
initializing a RobustShare protocol to distribute a block of secret data among a set of servers comprising n servers of a synchronous network, a plurality of the n servers each being part of a mobile storage platform, wherein the block of secret data comprises a plurality of shares of data, wherein each server in the set of servers holds one share of data encoding the block of secret data, and wherein the plurality of shares of data is transmitted electronically via a secure, authenticated broadcast channel;
initializing at least one Block-Redistribute protocol to protect against at least one adversary that attempts to corrupt the set of servers, wherein during a Block-Redistribute protocol the set of servers periodically refreshes its plurality of shares of data such that each server holds a new share of data that is independent of the previous share of data;
initializing a Reco protocol to reveal the block of secret data,
wherein a communication complexity for each of the protocols is $O(W+n^3)$ where W denotes a number of secrets and O represents big O notation; and
periodically erasing, by each server, the plurality of shares of data to preserve security against an adversary.

10. The method as set forth in claim 9, wherein the block of secret data is of size l, wherein l is the highest power of 2 not greater than n/4, and wherein each block of secret data is stored in a polynomial H of degree$\leq$d=l+2t−1, where t denotes a threshold of corruption defines a maximum number of servers the at least one adversary may corrupt.

11. The method as set forth in claim 10, wherein n can increase or decrease by a factor of two at each Block-Redistribute protocol regardless of t.

12. The method as set forth in claim 11, wherein the system provides perfect security, such that provided that the at least one adversary does not corrupt more than t servers, the probability of the at least one adversary compromising the privacy or correctness of the block of secret data is zero.

13. The method as set forth in claim 12, wherein the threshold of corruption t is $\frac{1}{3}-\epsilon$, where $\epsilon$ is an arbitrary positive constant, wherein provided that the at least one adversary corrupts no more than a $\frac{1}{3}-\epsilon$ fraction of the set of servers, then the system maintains its security.

14. The method as set forth in claim 9, wherein the at least one mobile storage platform has as secure erasure feature.

15. A computer program product for proactive secret sharing amongst a plurality of mobile storage platforms, the computer program product comprising computer-readable instructions stored on a non-transitory computer-readable medium that are executable by a computer having a processor for causing the processor to perform operations of:
initializing a RobustShare protocol to distribute a block of secret data among a set of servers comprising n servers of a synchronous network, a plurality of the n servers each being part of a mobile storage platform, wherein the block of secret data comprises a plurality of shares of data, wherein each server in the set of servers holds one share of data encoding the block of secret data, and wherein the plurality of shares of data is transmitted electronically via a secure, authenticated broadcast channel;
initializing at least one Block-Redistribute protocol to protect against at least one adversary that attempts to corrupt the set of servers, wherein during a Block-Redistribute protocol the set of servers periodically refreshes its plurality of shares of data such that each server holds a new share of data that is independent of the previous share of data;
initializing a Reco protocol to reveal the block of secret data,
wherein a communication complexity for each of the protocols is $O(W+n^3)$, where W denotes a number of secrets and O represents big O notation; and
periodically erasing, by each server, the plurality of shares of data to preserve security against an adversary.

16. The computer program product as set forth in claim 15, wherein the block of secret data is of size l, wherein l is the highest power of 2 not greater than n/4, and wherein each block of secret data is stored in as polynomial H of degree$\leq$d=l+2t−1, where t denotes a threshold of corruption defines a maximum number of servers the at least one adversary may corrupt.

17. The computer program product as set forth in claim 16, wherein n can increase or decrease by a factor of two at each Block-Redistribute protocol regardless of t.

18. The computer program product as set forth in claim 17, wherein the system provides perfect security, such that provided that the at least one adversary does not corrupt more than t servers, the probability of the at least one adversary compromising the privacy or correctness of the block of secret data is zero.

19. The computer program product as set forth in claim 18, wherein the threshold of corruption t is $\frac{1}{3}-\epsilon$, where $\epsilon$ is an arbitrary positive constant, wherein provided that the at least one adversary corrupts no more than a $\frac{1}{3}-\epsilon$ fraction of the set of servers, then the system maintains its security.

20. The computer program produce as set forth in claim 15, wherein the at least one mobile storage platform has a secure erasure feature.

* * * * *